US008066383B2

(12) United States Patent
Lin

(10) Patent No.: US 8,066,383 B2
(45) Date of Patent: Nov. 29, 2011

(54) WIRE HARNESS PROJECTION GUIDANCE SYSTEM AND METHOD

(75) Inventor: Xiao Lin, West Chicago, IL (US)

(73) Assignee: Siemens Industry, Inc., Alpharetta, GA (US)

(*) Notice: Subject to any disclaimer, the term of this patent is extended or adjusted under 35 U.S.C. 154(b) by 1035 days.

(21) Appl. No.: 11/691,883

(22) Filed: Mar. 27, 2007

(65) Prior Publication Data

US 2008/0054154 A1 Mar. 6, 2008

Related U.S. Application Data

(60) Provisional application No. 60/842,173, filed on Sep. 1, 2006.

(51) Int. Cl.
*G03B 21/26* (2006.01)
*B23P 21/00* (2006.01)

(52) U.S. Cl. ............................... 353/28; 353/70; 29/720

(58) Field of Classification Search .................... 353/28, 353/69, 70; 29/720, 721, 868
See application file for complete search history.

(56) References Cited

U.S. PATENT DOCUMENTS 2,805,471 A * 9/1957 Lowden .......................... 29/868
4,190,890 A * 2/1980 Marx ................................ 716/1
6,367,933 B1 * 4/2002 Chen et al. ....................... 353/69
6,530,677 B1 * 3/2003 Mori et al. .................... 362/286

* cited by examiner

*Primary Examiner* — Thanh X Luu

(57) ABSTRACT

A wire harness projection guidance system comprises a support stand for supporting a wire harness board used to construct a wire harness. A projector is mounted to the support stand for projecting an image onto a wire harness board supported on the support stand. A memory stores data representing wire route for each of a plurality of individual wires in a wire harness. A programmed processing system is operatively coupled to the memory and the projector for generating a series of images to be projected by the projector. Each image in the series represents one of the stored wire routes for an associated individual wire.

16 Claims, 5 Drawing Sheets

WIRE HARNESS PROJECTION GUIDANCE SYSTEM AND METHOD

CROSS REFERENCE TO RELATED APPLICATIONS

This application claims priority of provisional application No. 60/842,173, filed Sep. 1, 2006.

FIELD OF THE INVENTION

This application relates to manufacture of wire harnesses and, more particularly, to a wire harness projection guidance system and method.

BACKGROUND OF THE INVENTION

Electrical control systems, such as motor control center (MCC) units include individual control components, such as starters, circuit breakers, etc. Such MCC units, or the like, are typically provided with the control components pre-wired. Pre-wiring is facilitated by creating a wire harness with a plurality of individual wires pre-cut, terminated, bent, positioned, and held together with wire ties. The wire harness can then be positioned in the MCC unit and the wires terminated as necessary. This saves time in assembling the MCC unit, increasing productivity.

Challenges in conventional wire harness systems and methods include expensive labor costs and low productivity. Different MCC units have different wire harnesses. It may take an operator a long time to determine the appropriate way to route the wire. Typically, the operator is not provided any guidance to transfer the schematic drawing to harness routing. A skilled worker is required in order to digest the schematic and build the wire harness, which increases labor costs.

Conventional wire harnesses may not be precise. Although a standard harness board may be used to help the operator, one harness board cannot cover all the different wire harnesses of all the MCC units. Additional labor is required at wiring stage to re-cut and re-strip an imprecise harness. The above can result in increasing the likelihood of mistakes and wiring the wrong connection.

The present invention is directed to solving one or more of the problems discussed above.

SUMMARY OF THE INVENTION

The present invention is directed to a wire harness projection guidance system and method which displays an image to identify a wire route for a harness board. This system and method makes it easier and more convenient for operators to build wire harnesses. The wire harness projection guidance system and method can be applied to other guidance systems and method which need precise location or placement of an object.

In accordance with one aspect of the invention, there is disclosed a wire harness projection guidance system comprising a support stand for supporting a wire harness board used to construct a wire harness. A display device is mounted proximate the support stand for displaying an image. A control system is operatively associated with the display device for generating a series of images to be displayed on the display device. Each image in the series represents a wire route in a wire harness for an associated individual wire.

In accordance with one aspect of the invention the display device is a projector mounted to the support stand for projecting an image onto a wire harness board supported on the support stand.

It is a feature of the invention that a mirror may be mounted to the support stand and the projector projects the image to the mirror to be reflected onto a wire harness board supported on the support stand.

It is another feature of the invention that light from the projector to a wire harness board is at a select, non-perpendicular, projection angle relative to a wire harness board supported on the support stand, and the projection control system is adapted to modify the generated series of images to adjust for the projection angle.

It is a further feature of the invention that each image in the series to be projected by the projector includes indicia identifying the associated individual wire.

It is still another feature of the invention that the image in the series to be projected by the projector may comprise a plurality of colors.

It is still a further feature of the invention that the support stand comprises a bench supporting a wire harness board used to construct a wire harness and a rack, physically isolated from the bench, mounting the projector.

In accordance with another aspect of the invention the display device is a display monitor.

There is disclosed in accordance with another aspect of the invention a wire harness projection guidance system comprising a support stand for supporting a wire harness board used to construct a wire harness. A projector is mounted to the support stand for projecting an image onto a wire harness board supported on the support stand. A memory stores data representing a wire route for each of a plurality of individual wires in a wire harness. A programmed processing system is operatively coupled to the memory and the projector for generating a series of images to be projected by the projector. Each image in the series represents one of the stored wire routes for an associated individual wire.

There is disclosed in accordance with a further aspect of the invention a wire harness projection guidance method comprising supporting a wire harness board used to construct a wire harness on a support stand; providing a projector mounted to the support stand for projecting an image onto the wire harness board; storing data in a memory representing wire route for each of a plurality of individual wires in the wire harness; and operating a programmed processing system operatively coupled to the memory and the projector to generate a series of images to be projected by the projector, each image in the series representing one of the stored wire routes for an associated individual wire.

Further features and advantages of the invention will be readily apparent from the specification and from the drawings.

DETAILED DESCRIPTION OF THE INVENTION

In accordance with the invention, a wire harness projection guidance system and method assists manufacture of a wire harness. Wire routes are calculated based on a wire connection list and panel layout to display and project to a harness board. This enables a non-skilled worker to make a wire harness based on the projected wire routes. There is no need to understand a schematic to make the wire harness. Wires can be pre-cut, pre-stripped and pre-marked by machine, saving the labor cost of a typically manual operation. This also results in a wire harness being precise and consistent. The projection guidance system lays out the wire route exactly to the print. The routing path is determined by the design and projected by the guidance system. This should result in fewer errors.

The projection guidance system in accordance with the invention uses standard commercial products, such as a projector, monitor and mirror. The projection guidance system can simultaneously display multiple objects and text with different colors and different line widths. The illumination used is safe and the intensity of light from the projector is much lower than other systems, such as a laser. Finally, the projection guidance system and method does not require a fixed projection angle. The set up of the harness board, such as the angle between the harness board and the work bench, can be adjusted to the comfort of the individual operator.

Figure 1:
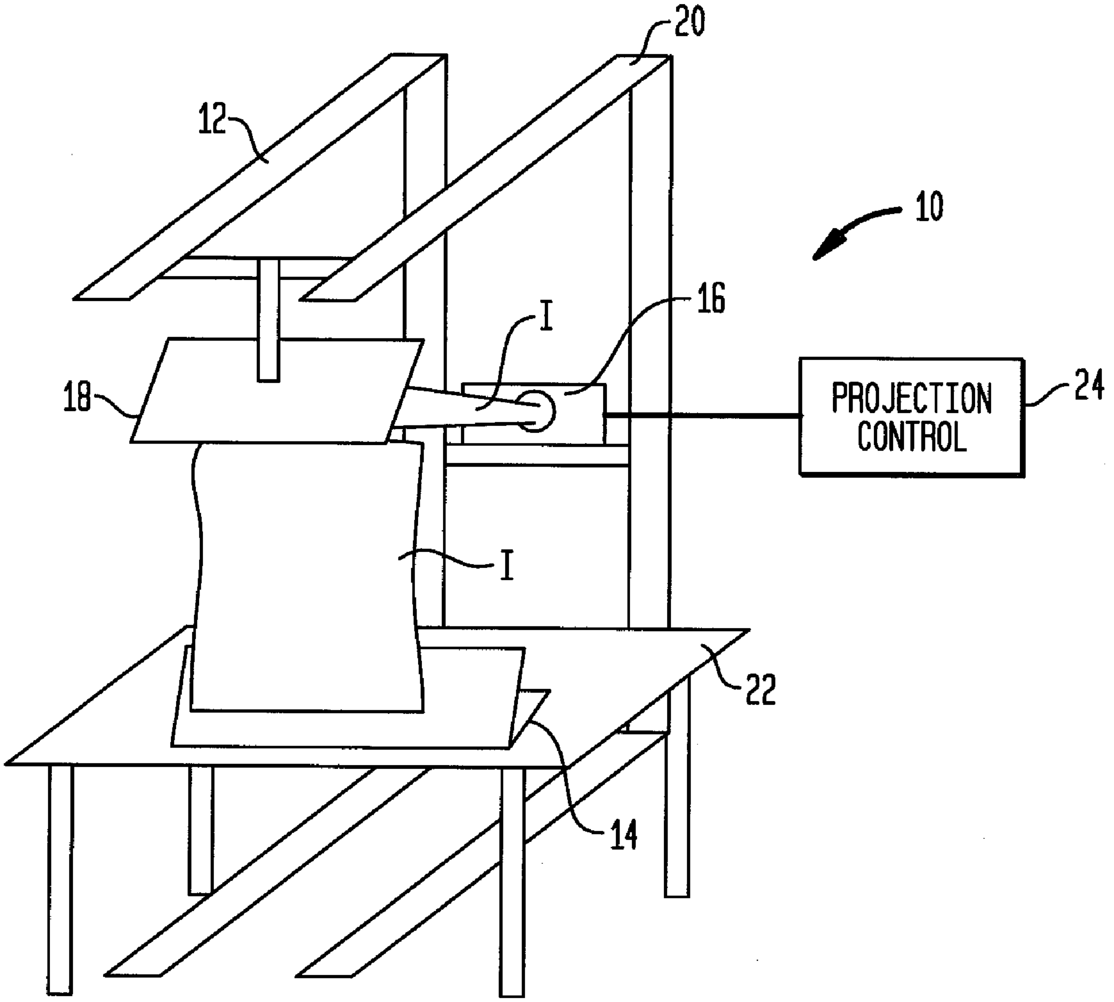
FIG. 1 is a perspective view of a wire harness projection guidance system in accordance with the invention.

Referring to FIG. 1, a wire harness projection guidance system 10 in accordance with the invention is illustrated. The system 10 comprises a support stand 12 for supporting a wire harness board 14 used to construct a wire harness. A projector 16 is mounted to the support stand 12 for projecting a display image onto the wire harness board 14. A mirror 18 is mounted to the support stand 12. The projector 16 projects the display image to the mirror 18 to be reflected onto the wire harness board 14. The projected display image is generally illustrated as projected light I.

The wire harness projection guidance system 10 uses minimal parts and simple structures. The support stand 12 consists of two separate elements, namely, a rack 20 and a work bench 22. The mirror 18 and projector 16 are mounted to the rack 20, as shown. Both the projector 16 and the mirror 18 can be adjusted to direct the projected image I. The mirror 18 reflects the light from the projector 16 to the harness board 14 which shortens the light path in half. The rack 20 and work bench 22 are physically isolated from one another so that vibration does not propagate from the work bench 22 to the rack 20. The harness board 14 is adjustably mounted on the work bench 22, in any known manner, to obtain a proper angle for ergonomic purposes.

A projection control system 24 is operatively connected to the projector 16 for generating the projected display image I. The projection control system 24 comprises a computer system, as described below, which may be mounted to the work bench 22. A tube rack (not shown) may be mounted to or proximate the work bench 22 for storing pre-cut wires.

Figure 2:
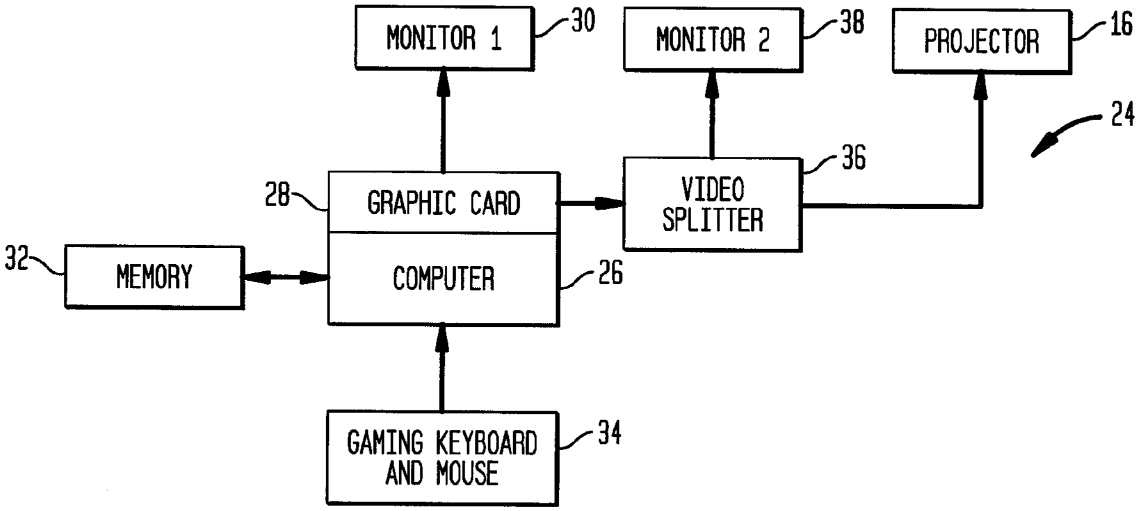
FIG. 2 is a block diagram of the projection control system of the projection guidance system of FIG. 1.

Referring to FIG. 2, the projection control system 24 is illustrated in block diagram form. The projection control system 24 includes a programmed processing system in the form of a computer 26. The computer 26 may be a conventional personal computer or the like including a graphics card 28 for generating a display image to a first display monitor 30. The computer is operatively coupled to a memory 32. The memory stores operating programs, such as a CAD program, and data representing wire routes for each of a plurality of individual wires in a wire harness. A gaming keyboard and mouse 34 are operatively coupled to the computer 26. The graphics card 28 also develops an image to a video splitter 36 which provides the image to a second display monitor 38 and to the projector 16.

Particularly, the computer display is split into the two monitors 30 and 38. One-half of the stream comprises the original drawing and wire routing displayed on the first monitor 30. The other half of the screen, comprising the projected display image I, displays simultaneously on the second monitor 38 and the projector 16. If an operator cannot see the projector light route clearly on the harness board, then the operator can look at the exact route on the first display monitor 30. The gaming keyboard 34 is used for one touch operation. Some keys on the gaming keyboard 34 can be configured to simulate a series of key strokes. The mouse is used in the calibration procedure, described below, with the cursor projected on the harness board aligned with a grid.

Figure 3:
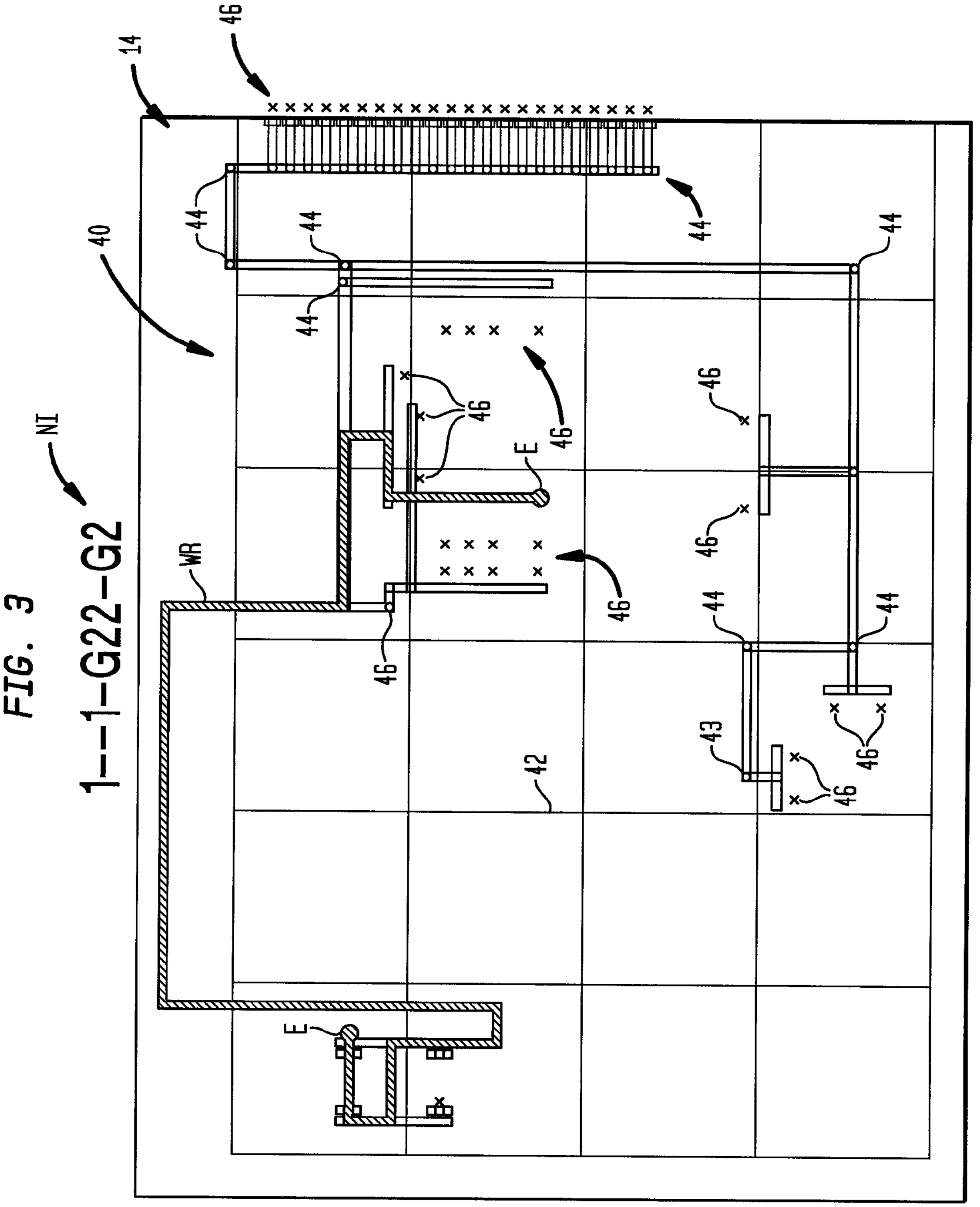
FIG. 3 illustrates an image projected by the projection control system of FIG. 2 onto a wire harness board.

Referring to FIG. 3, an exemplary wire harness board 14 is illustrated. As is apparent, the details on any particular wire harness board 14 depend on the wire harness to be manufactured. The wire harness board 14 may be constructed of a wood panel or the like, having a printed image 40 thereon. The display image 40 may include a grid 42. Mounted to the harness board 14 are various components, such as nails 44, and wire holders 46. Such components are conventional in a wire harness board. In accordance with the invention, the projection control system 24 is used to operate the projector 16 to project a display image onto the wire harness board 14. FIG. 3 illustrates an image of a single wire route WR in the form of a solid wide line. The image shows end positions E and a continuous path between the end positions E. Projecting this image WR onto the wire harness board 14 is used by the operator as a guide to position and bend a pre-cut wire as shown by the projected image. The projected image also includes alpha-numerical indicia NI associated with the displayed wire route WR. The format of the text is (wire route number)-(label on wire)-(wire end one gateway)-(wire end two gateway). In this example, wire number 1, which would be positioned in tube rack position 1, bearing label "1" routes from gateway 22 to gateway 2. The gateway numbers are shown on the harness board printed image 40. The wire route test indicia reminds the operator to pick the correct wire and route it accordingly.

Portions of other wire routes are illustrated in double line in FIG. 3. In accordance with the invention, the computer 26 generates a series of images to be projected by the projector 16, each image in the series representing one of the stored wire routes in the memory 32 for an associated individual wire.

Figure 4:
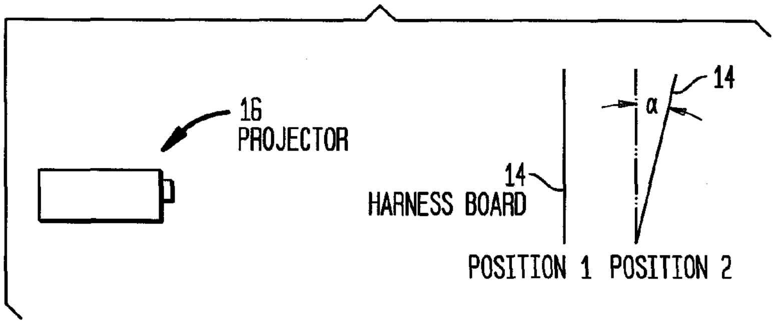
FIG. 4 is a generalized diagram illustrating a perpendicular light pattern relative to a non-perpendicular light pattern.
Figure 5:
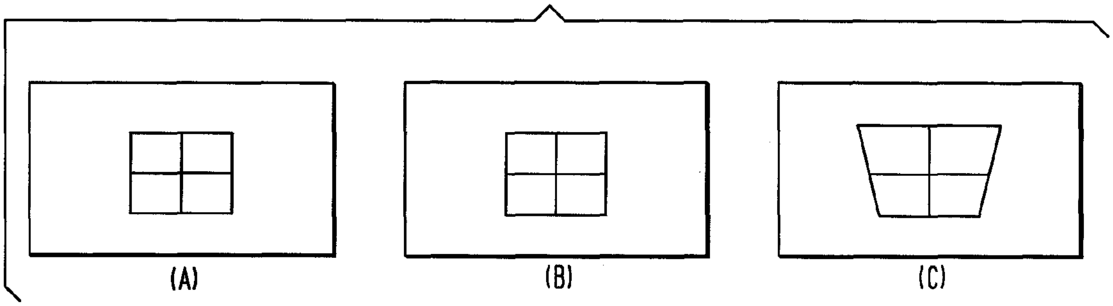
FIG. 5 comprises a series of images in the form of grids illustrating difference between perpendicular and non-perpendicular light patterns.

The shape of the projected display image is sensitive to the projection angle, as described in connection with FIGS. 4 and 5. In FIG. 5, image (a) comprises an image to be projected from the projector 16. For illustration purposes, the image comprises a grid pattern. If the harness board 14 is in position 1, shown in FIG. 4, perpendicular to the projected image from the projector 16, then the projected pattern on the harness board 14, shown in FIG. 5 image (b) matches with the desired pattern from the original image in FIG. 5 image (a). When the light beam is not perpendicular to the harness board 14, such as shown in position 2 in FIG. 4, the projected pattern is similar to that in FIG. 5 image (c) which is distorted relative to the original image of FIG. 5 image (a). It can be difficult and costly to design a fixed angle projection system. Moreover, a fixed angle projection system would be inflexible and inconvenient in real life manufacturing environments, where it is desired to modify position of the harness board 14 for ergonomic reasons.

Figure 6:
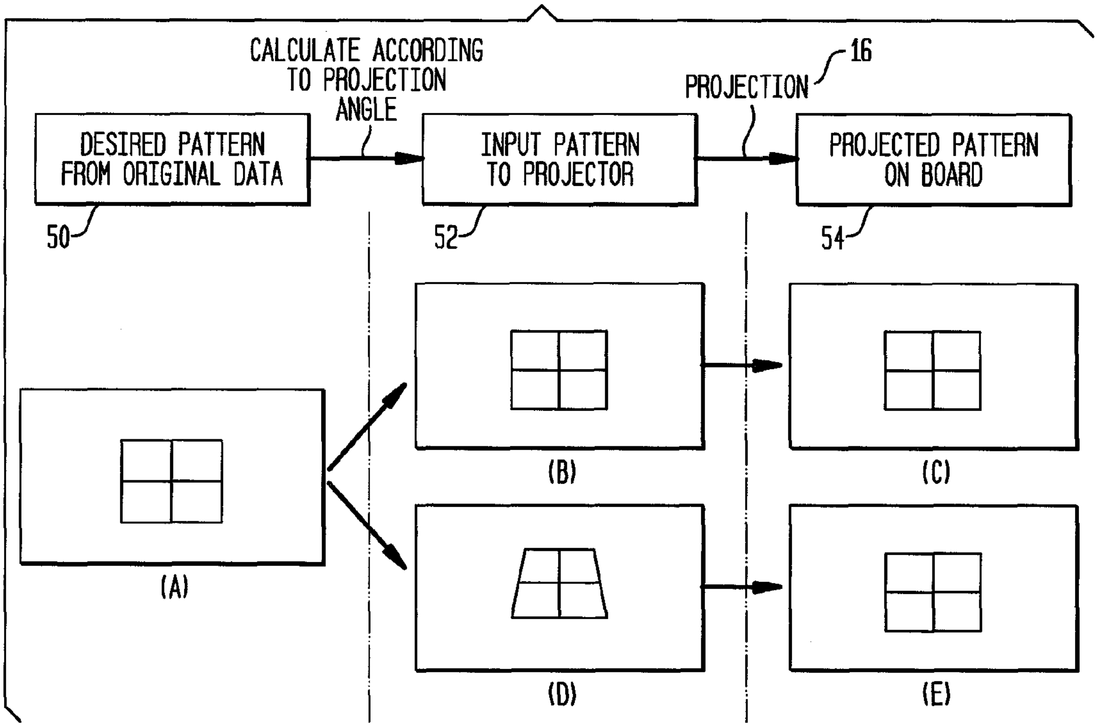
FIG. 6 illustrates a flow chart of calculation of a desired pattern based on projection angle.

In accordance with the invention, the projection control system 24 uses an adjustable projection angle correction. The projection control system 24 recalculates the original two dimensional pattern data according to the projection angle α, see FIG. 4, and calibrates this angle in the projection process. This correction is illustrated in FIG. 6. There are three stages in the process. In the first stage, a desired pattern is generated from original data at a block 50 which is shown at FIG. 6 image (a). In the second stage, the pattern is recalculated according to the projection angle. The recalculated pattern is the input pattern to the projector at a block 52. In the third stage, the pattern is projected onto the harness board at a block 54. In a first example, the harness board 14 is located at position 1, see FIG. 4, where the board 14 is perpendicular to the light beam. The input pattern to the projector is shown in image FIG. 6 image (b) which is the same as the desired pattern in FIG. 6 image (a). The projected pattern is shown in FIG. 6 image (c) which also matches the desired pattern. In the second situation, the harness board 14 is located at position 2, see FIG. 4, where the board is not perpendicular to the light path, but positioned at a projection angle α. The pattern in FIG. 6 image (a) is recalculated based on the projection angle. The recalculated input pattern to the projector is shown in FIG. 6 image (d). The final pattern projected on the board is shown at FIG. 6 image (e) which matches the desired pattern. The combination of the recalculated input pattern and the projection angle, results in the desired image being shown. By recalculating the pattern according to the projection angle, any pattern can be precisely projected on the harness board 14 with any projection angle.

In a practical system, it is difficult to measure the projection angle α, as it can depend on the position of the projector 16, the mirror 18, and the harness board 14. In accordance with the invention, the projection control system 24 is adapted to effectively determine the projection angle by measuring non-proportional segment length ratios. A known grid of n×m is printed on the harness board 14 as the grid 42, see FIG. 3. During the calibration process, the computer 26 generates a cursor crosshair projected onto the harness board 14. The operator positions the crosshair at each intersection point on the grid 42 and depresses a mouse button so that the computer 26 captures position information for the mouse. The computer program can determine based on relative positions the specific points being measured and sort the points to automatically determine the difference in proportion, representing projection angle. The coordinates of the grid is captured in a CAD software program running in the computer 26. Based on the captured coordinates and true dimension of the grids, calibration parameters $a_1$, $a_2$, $a_3$, $a_4$, $a_5$ and $a_6$ are calculated by a linear curve fit. The following equations comprise transfer equations from the original coordinate (x, y) to the projected coordinate (x□, y□)

$$y'=a_1\cdot y+a_2$$

$$x'=b_1\cdot x+b_2$$

where $b_1=a_3\cdot y+a_4$ and $b_2=a_5-b_1\cdot a_6$

These equations are used to recalculate end points for each line segment in a wire route. As described above, FIG. 5 image (c) shows the projected image for the harness board 14 at position 2, without calibration, and FIG. 6 image (e) with calibration.

Figure 7:
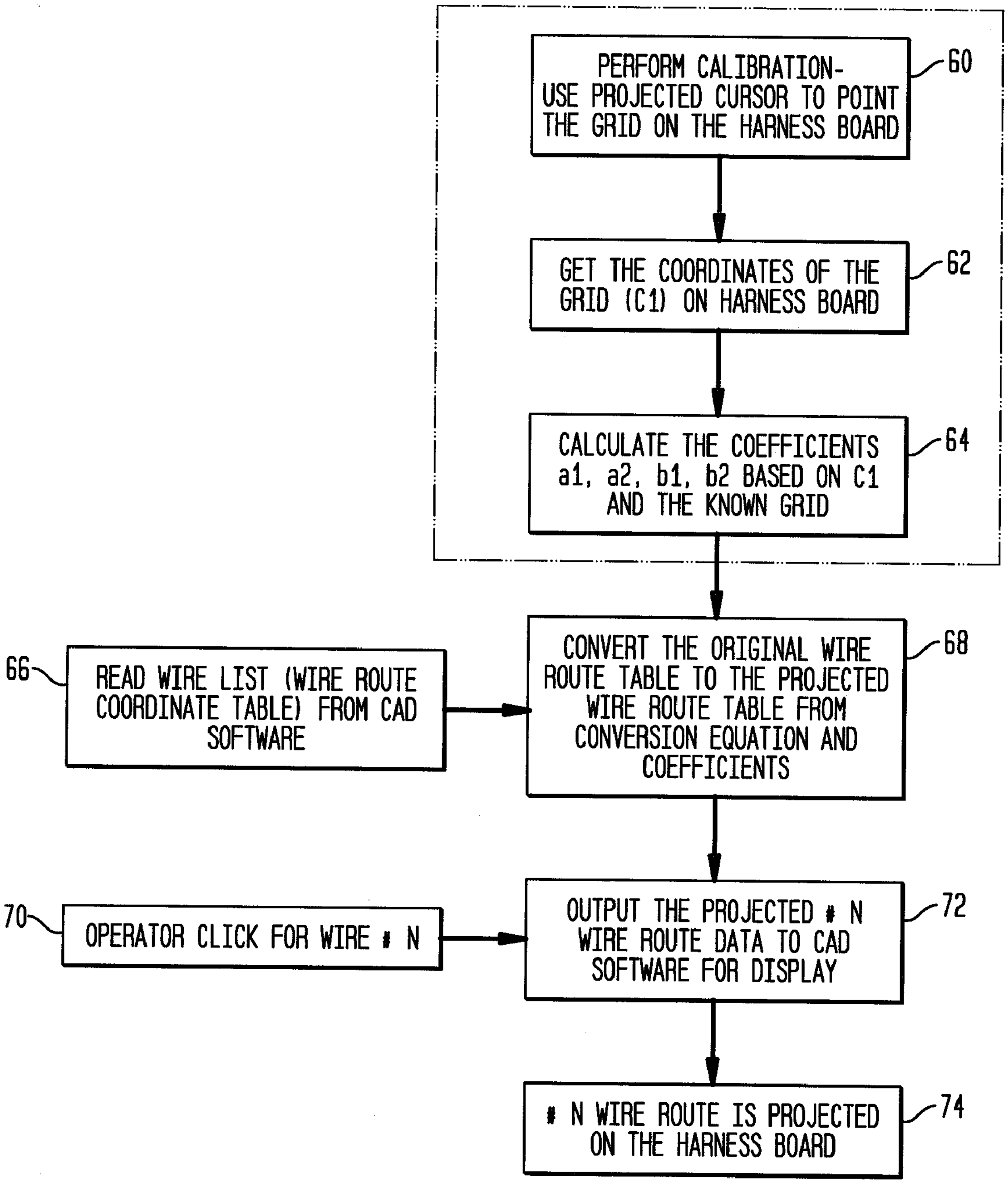
FIG. 7 is a flow diagram illustrating a program implemented in the computer of FIG. 2 for generating a series of images to be projected by the projector.

FIG. 7 illustrates a flow diagram of the software implemented in the computer 26 for the wire harness projection guidance system and method in accordance with the present invention. Beginning at a block 60, calibration is performed by the user identifying the grid points, as described above. The projector 16 projects the cursor to a particular point on the harness board 14 and the user identifies the appropriate intersection points on the grid 42. The computer 26 reads the coordinates of the projected grid (C1) at a block 62. A block 64 calculates the coefficients based on the projected grid C1 and the known, desired grid. The computer reads the wire list, comprising a wire route coordinate table, from CAD software at a block 66. The software converts the original wire route table to the projected wire route table from the conversion equations, above, and the calculated coefficients at a block 68.

As is apparent, each wire harness includes a plurality of wires. Each wire has a designated wire route based on its function in a particular circuit. The projection control system 24 generates a unique image for each of the wires. At a block 70, a user clicks or requests a wire route for a particular wire #N. The computer 26 outputs the projected #N wire route to the first monitor 30 and the video splitter 36 at a block 72 for display. The #N wire route is projected on the wire harness board 14 by the projector 16 at a block 74. The user then returns to the block 70 to select another wire number for routing on the wire harness.

In accordance with the invention, each image in the series of images can use a different color. Also, it is possible to overlay plural images, if necessary or desired. Most commonly, the user would step through the series of images in a preselect sequence according to the desired layout for the wire harness. However, the operator can select any particular wire at any time, as necessary or desired.

In a simplified embodiment of the guidance system and method, the projector 16 and second monitor 38 may be omitted. Instead the series of display images would be displayed on the first display monitor 30. In this embodiment, an operator familiar with the harness board and grids can use the displayed series of images as a guide to route the wires on the harness board.

Thus, in accordance with the invention, there is provided a wire harness projection guidance system and method which generates a series of display images to be displayed on a display monitor and/or projected by a projector to be displayed on a harness board, each image in the series representing one of a plurality of stored wire routes for an associated individual wire.

The present invention has been described with respect to flowcharts and block diagrams. It will be understood that each block of the flowchart and block diagrams can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

I claim:

1. A wire harness projection guidance system comprising:

a support stand for supporting a wire harness board used to construct a wire harness;

a projector mounted to the support stand for projecting an image onto the wire harness board; and a control system operatively associated with the projector for generating a series of images to be displayed by the projector, each image in the series representing a wire route in the wire harness for an associated individual wire wherein each wire route is used as a template to shape an associated wire and wherein light from the projector to the wire harness board is at a select, non-perpendicular, projection angle relative to the wire harness hoard supported on the support stand and the control system is adapted to modify the generated series of images to adjust for the projection angle wherein the projection angle is calculated using calibration coefficients based on a projected grid and a desired grid.

2. The wire harness projection guidance system of claim 1 further comprising a mirror mounted to the support stand and the projector projects the image to the mirror to he reflected onto the wire harness board supported on the support stand.

3. The wire harness projection guidance system of claim 1 wherein each image in the series includes indicia identifying the associated individual wire.

4. The wire harness projection guidance system of claim 1 further including a display monitor for displaying each wire route.

5. A wire harness projection guidance system comprising:

a support stand for supporting a wire harness board used to construct a wire harness;

a rack for supporting a projector used for projecting an image onto the wire harness board supported on the support stand;

a memory storing data representing wire route for each of a plurality of individual wires in the wire harness; and a programmed processing system operatively coupled to the memory and the projector for generating a series of images to be projected by the projector, each image in the series representing one of the stored wire routes for an associated individual wire wherein each wire route is used as a template to shape an associated wire and wherein light from the projector to the wire harness board is at a select, non-perpendicular, projection angle relative to the wire harness board supported on the support stand, and the programmed processing system is adapted to modify the generated series of images to adjust for the projection angle wherein the projection. angle is calculated using calibration coefficients based on a projected grid and a desired grid.

6. The wire harness projection guidance system of claim 5 further comprising a mirror mounted to the support stand and the projector projects the image to the mirror to be reflected onto the wire harness board supported on the support stand.

7. The wire harness projection guidance system of claim 5 wherein the programmed processing system is programmed to implement a calibrate routine to determine the projection angle and modifying the stored wire routes according to the determined projection angle.

8. The wire harness projection guidance system of claim 5 wherein each image in the series to be projected by the projector includes indicia identifying the associated individual wire.

9. The wire harness projection guidance system of claim 5 wherein the images in the series to be projected by the projector comprise a plurality of colors.

10. The wire harness projection guidance system of claim 5 wherein the support stand further includes a bench supporting the wire harness board used to construct the wire harness wherein the rack is physically isolated from the bench.

11. A wire harness projection guidance method comprising:

supporting a wire harness board used to construct a wire harness on a support stand;

providing a projector mounted to the support stand for projecting an image onto the wire harness board;

storing data in a memory representing wire route for each of a plurality of individual wires in the wire harness; and operating a programmed processing system operatively coupled to the memory and the projector to generate a series of images to be displayed on the display device, each image in the series representing one of the stored wire routes for an associated individual wire wherein each wire route is used as a template to shape an associated wire and wherein light from the projector to the wire harness board is at a select, non-perpendicular, projection angle relative to the wire harness board supported on the support stand and the programmed processing system modifies the generated series of images to adjust for the projection angle wherein the projection angle is calculated using calibration coefficients based on a projected grid and a desired grid.

12. The wire harness projection guidance method of claim 11 further comprising providing a mirror mounted to the support stand and the projector projects the image to the minor to he reflected onto the wire harness board.

13. The wire harness projection guidance method of claim 11 wherein the programmed processing system implements a calibrate routine to determine the projection angle and modifies the stored wire routes according to the determined projection angle.

14. The wire harness projection guidance method of claim 11 wherein each image includes indicia identifying the associated individual wire.

15. The wire harness projection guidance method of claim 11 wherein the programmed processing system generates the images in the series in a plurality of different colors.

16. The method of claim 11 further including a display monitor for displaying each wire route.

* * * * *